United States Patent
Li et al.

(10) Patent No.: US 11,978,174 B1
(45) Date of Patent: May 7, 2024

(54) VIRTUAL SHOE TRY-ON

(71) Applicant: Amazon Technologies, Inc., Seattle, WA (US)

(72) Inventors: Yuelong Li, Santa Clara, CA (US); Gitika Karumuri, Santa Clara, CA (US); Miriam Bellver Bueno, Barcelona (ES); Sunil Sharadchandra Hadap, Dublin, CA (US); Ashwin Swaminathan, Dublin, CA (US); Amogh Gupta, New York, NY (US); Xin Shen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 17/706,159

(22) Filed: Mar. 28, 2022

(51) Int. Cl.
*G06T 19/00* (2011.01)
*G06N 3/08* (2023.01)
*G06Q 30/0601* (2023.01)
*G06T 19/20* (2011.01)
*G06V 10/40* (2022.01)
*G06V 10/82* (2022.01)
*G06V 40/10* (2022.01)

(52) U.S. Cl.
CPC ............ *G06T 19/20* (2013.01); *G06N 3/08* (2013.01); *G06Q 30/0643* (2013.01); *G06V 10/40* (2022.01); *G06V 10/82* (2022.01); *G06V 40/10* (2022.01); *G06T 2210/22* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 9,460,557 B1 * | 10/2016 | Tran | G06T 15/205 |
| 9,460,577 B2 | 10/2016 | Tran | |
| 9,996,981 B1 * | 6/2018 | Tran | A43B 3/34 |
| 10,467,526 B1 * | 11/2019 | Appalaraju | G06V 10/774 |
| 10,732,261 B1 * | 8/2020 | Wang | G01S 7/417 |
| 11,176,738 B2 | 11/2021 | Revok | |
| 11,574,421 B2 * | 2/2023 | Koh | G06T 7/97 |

(Continued)

OTHER PUBLICATIONS

Chou et al.; PIVTONS: Pose invariant virtual try-on shoe with conditional image completion; Computer Vision-ACCV 2018: 14th Asian Conference on Computer Vision; Perth, Australia, Dec. 2018 pp. 654-668.

(Continued)

*Primary Examiner* — Martin Mushambo
(74) *Attorney, Agent, or Firm* — K&L Gates LLP

(57) ABSTRACT

A method includes extracting, using a backbone of a machine learning model, a plurality of features from an image of a foot and predicting, using a first portion of the machine learning model and based on one or more features of the plurality of features, a first aspect of the foot. The method also includes predicting, using a second portion of the machine learning model and based on one or more features of the plurality of features, a second aspect of the foot different from the first aspect, generating, using at least the first aspect and the second aspect, a two-dimensional model of a shoe, and superimposing the two-dimensional model of the shoe onto the image of the foot.

17 Claims, 11 Drawing Sheets

(56) References Cited

U.S. PATENT DOCUMENTS

| | | | |
|---|---|---|---|
| 2009/0051683 A1* | 2/2009 | Goonetilleke | A43D 1/025 348/207.1 |
| 2009/0208113 A1* | 8/2009 | Bar | A43D 1/022 600/592 |
| 2012/0013630 A1* | 1/2012 | Rutschmann | G06T 11/60 345/593 |
| 2013/0124156 A1* | 5/2013 | Wolper | G06T 17/00 703/1 |
| 2013/0215116 A1* | 8/2013 | Siddique | G06Q 20/40 705/26.7 |
| 2013/0307851 A1* | 11/2013 | Hernandez | G06T 17/00 345/420 |
| 2015/0003690 A1* | 1/2015 | Masuko | G06T 11/60 382/111 |
| 2015/0058169 A1* | 2/2015 | Arayama | G06Q 30/0623 705/26.61 |
| 2015/0199816 A1* | 7/2015 | Freeman | G06T 7/74 382/103 |
| 2016/0286906 A1* | 10/2016 | Malal | A43B 17/00 |
| 2017/0032579 A1 | 2/2017 | Eisemann | |
| 2017/0053335 A1* | 2/2017 | Hanscom | A43D 1/027 |
| 2017/0168586 A1* | 6/2017 | Sinha | G06V 40/11 |
| 2017/0243085 A1* | 8/2017 | Vanhoucke | G06V 10/454 |
| 2017/0249783 A1* | 8/2017 | Mach Shepherd | G06T 17/20 |
| 2017/0272728 A1* | 9/2017 | Rafii | G06Q 30/0631 |
| 2018/0033202 A1* | 2/2018 | Lam | G06V 40/10 |
| 2018/0247426 A1* | 8/2018 | Gluck | G06Q 30/0643 |
| 2018/0253906 A1 | 9/2018 | Tran | |
| 2018/0300791 A1* | 10/2018 | Ganesan | G06Q 30/0601 |
| 2019/0180176 A1* | 6/2019 | Yudanov | G06N 3/045 |
| 2019/0220685 A1* | 7/2019 | Uchiyama | G06V 40/10 |
| 2019/0274395 A1* | 9/2019 | Stesin | A61B 5/1073 |
| 2020/0000180 A1 | 1/2020 | Sherrah | |
| 2020/0065991 A1* | 2/2020 | Chu | G06T 7/33 |
| 2020/0175334 A1* | 6/2020 | Zhang | G06F 18/217 |
| 2020/0275742 A1* | 9/2020 | Kim | A43D 1/025 |
| 2020/0320769 A1 | 10/2020 | Chen | |
| 2020/0334736 A1* | 10/2020 | Crabtree | G06F 16/9535 |
| 2020/0364935 A1* | 11/2020 | Revkov | A43D 1/025 |
| 2021/0125405 A1* | 4/2021 | Tran | A61B 5/0205 |
| 2021/0267315 A1* | 9/2021 | Ichikawa | A43D 1/06 |
| 2021/0295114 A1* | 9/2021 | Ye | G06F 16/5846 |
| 2022/0044439 A1* | 2/2022 | Hou | G06T 7/75 |
| 2022/0101417 A1 | 3/2022 | Boscolo | |
| 2022/0110413 A1 | 4/2022 | Che | |
| 2022/0230420 A1* | 7/2022 | Cheng | G06V 10/7715 |
| 2022/0270297 A1 | 8/2022 | Koh | |
| 2023/0230332 A1 | 7/2023 | Stoddart | |

OTHER PUBLICATIONS

Shan et al.; ARShoe: Real-time augmented reality shoe try-on system on smartphones; Proceedings of the 29th ACM International Conference on Multimedia. 2021; Oct. 2021; pp. 1111-1119.

* cited by examiner

VIRTUAL SHOE TRY-ON

BACKGROUND

The present disclosure relates to shoes, and more specifically, to fitting shoes on a person's feet. One challenge of purchasing shoes online is that a user may not have the opportunity to test the shoes on the user's feet before purchasing, and thus, it may be difficult to find shoes that are a good fit on the user's feet.

DETAILED DESCRIPTION

The present disclosure describes a virtual shoe try-on feature that allows a user to see how a shoe will look on the user's foot before the user purchases the shoe. The virtual shoe try-on feature uses machine learning to predict how a shoe will fit onto an image of the user's foot. The feature then superimposes a two-dimensional (2D) model of the shoe onto the image of the user's foot to show the user how the shoe will look on the user's foot.

Several different types of predictions need to be made to determine how the shoe will fit or look on the user's foot. One approach for making these predictions is to train different machine learning models (e.g., different neural networks) to make the different predictions. This approach, however, uses a lot of computing resources and may take a large amount of time, which may prevent the predictions from being performed on certain devices (e.g., a mobile device of the user).

The present disclosure describes an approach in which one machine learning model is trained to make the different types of predictions. The machine learning model (e.g., a neural network) includes a backbone that extracts several features that are used to make subsequent predictions. For example, the backbone may analyze an image of a user's foot to extract features of the foot (e.g., coordinates of the boundaries of the foot, the shape of the foot, the size of the foot). As another example, the backbone may analyze a model of a shoe to extract features of the shoe (e.g., coordinates of the boundaries of the shoe, the shape of the shoe, the size of the shoe). These features are then shared amongst other portions (e.g., subnetworks) of the machine learning model. These portions each use one or more of the extracted features to predict a different aspect of the foot or the shoe. For example, one portion of the machine learning model may use one or more the extracted features to predict an orientation of the foot. As another example, another portion of the machine learning model may use one or more of the extracted features to predict portions of the model of the shoe that will be occluded by the user's leg. As yet another example, another portion of the machine learning model may use one or more of the extracted features to predict whether the foot is a right or left foot. These predictions are used to generate a 2D model of the shoe, and the 2D model of the shoe is then superimposed onto the image of the user's foot. In this manner, the user can see what the shoe will look like on the user's foot. As a result of training one model to make the various predictions, the virtual shoe try-on feature may consume less computing resources, which may allow certain devices (e.g., a mobile device of the user) to implement the virtual shoe try-on feature, in certain embodiments.

Figure 1:
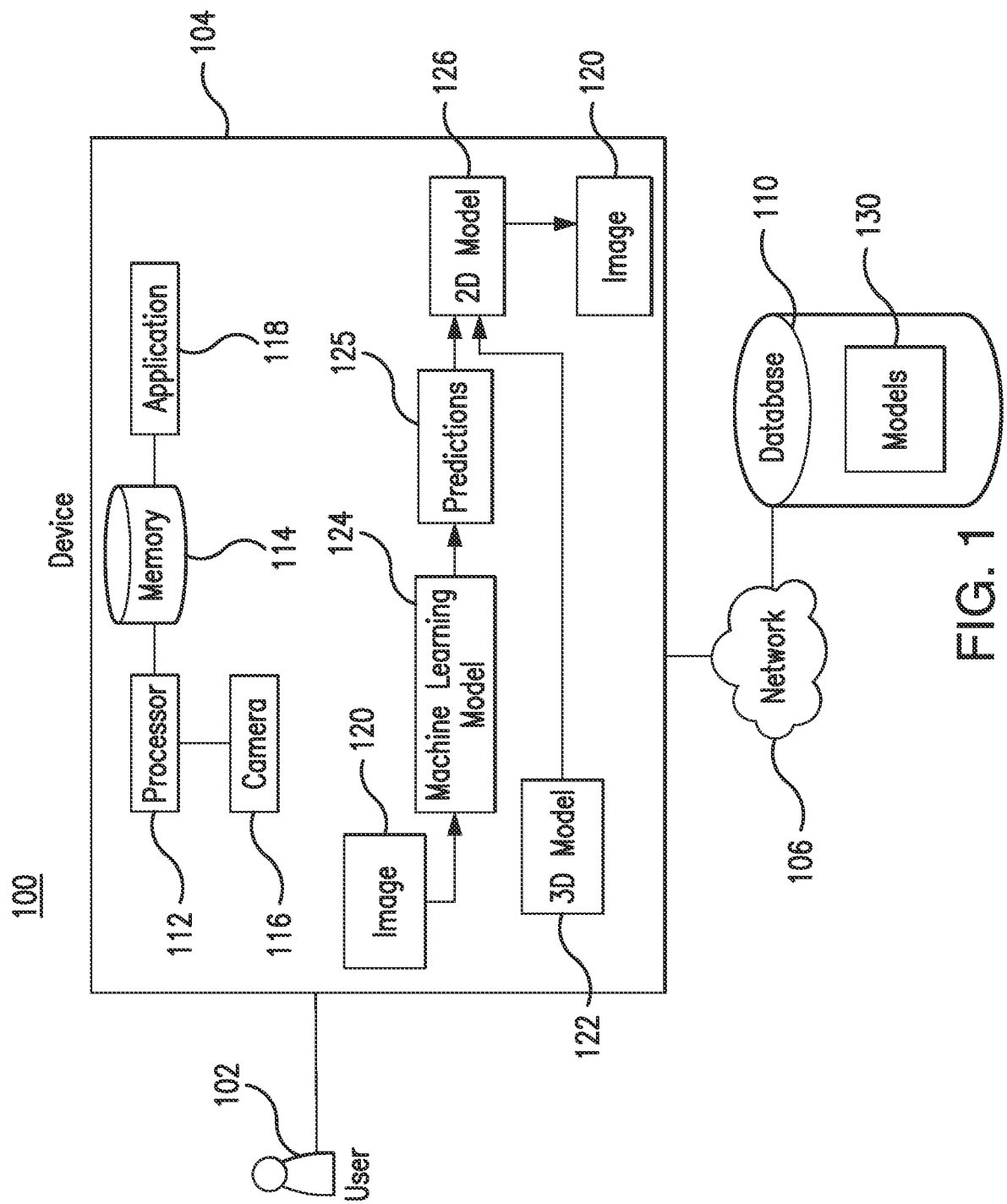
FIG. 1 illustrates an example system.

FIG. 1 illustrates an example system 100. As seen in FIG. 1, the system 100 includes a device 104, a network 106, and a database 110. Generally, the system 100 implements a virtual shoe try-on feature that allows a user 102 to see how a shoe would fit on the user's 102 foot before purchasing the shoe. The system 100 uses machine learning to generate a virtual model of a shoe based on a captured image of the user's 102 foot. The system 100 then superimposes the model of the shoe onto the image of the user's 102 foot to simulate the fit of the shoe on the user's 102 foot.

The device 104 may be a personal device of the user 102, such as, for example, a mobile phone or a laptop of the user 102. The user 102 uses the device 104 to shop for shoes online. When the user 102 finds a pair of shoes that the user 102 likes, the user 102 may use the virtual shoe try-on feature implemented by the device 104 to simulate the look and fit of the shoe on the user's 102 foot. As see in FIG. 1, the device 104 includes a processor 112, memory 114, and camera 116 that perform the actions and functions of the device 104.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102.

The processor 112 is any electronic circuitry, including, but not limited to one or a combination of microprocessors, microcontrollers, application specific integrated circuits (ASIC), application specific instruction set processor (ASIP), and/or state machines, that communicatively couples to memory 114 and controls the operation of the device 104. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on the memory 114 to perform any of the functions described herein. The processor 112 controls the operation and administration of the device 104 by processing information (e.g., information received from the database 110, network 106, and memory 114). The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 110 stores one or more models 130 of shoes that are available for purchase. In some embodiments, the database 110 stores three-dimensional (3D) models 130 of shoes. When the user 102 uses the device 104 to indicate that the user 102 would like to virtually try on a shoe, the device 104 communicates a query to the database 110 to retrieve the model 130 for that shoe. When the database 110 receives the query, the database 110 retrieves the model 130 of the desired shoe and communicates that model to the device 104 over the network 106. The device 104 may then process that model to simulate the look and fit of the shoe on the user's 102 foot.

The camera 116 captures an image or a series of images (e.g., a video) that is used or processed by the device 104. In some embodiments, the user 102 uses the device 104 to capture an image or a series of images of the user's 102 foot that is used for the virtual shoe try-on feature.

The device 104 executes an application 118 to implement one or more features of the device 104. For example, the application 118 may be a shopping application that the user 102 uses to shop for shoes online. The application 118 may also perform the virtual shoe try-on feature when instructed by the user 102. In some embodiments, the memory 114 stores the application 118, and the processor 112 executes the application 118 to perform one or more of the features or functions described herein.

In an example operation, the user 102 uses the device 104 to shop for shoes online. The user 102 may see a style of shoe that the user 102 likes, but the user 102 may not know what size shoe to purchase or how the shoe will look on the user's 102 foot. The user 102 may rely on the virtual shoe try-on feature to simulate the look and feel of the desired shoe on the user's 102 foot before purchasing the shoe.

When the user 102 indicates that the user 102 wants to use the virtual shoe try-on feature, the device 104 may request the user 102 use the device 104 to capture an image 120, or series of images 120, of the user's 102 foot. The user 102 may use the camera 116 of the device 104 to capture the image 120 of the foot. For example, the user 102 may direct the camera 116 at the user's 102 foot to capture the image 120 of the user's 102 foot. The image 120 may be of the user's 102 foot in any suitable state. For example, the image 120 may show the user 102 wearing a shoe over the foot. As another example, the image 120 may show the user 102 wearing a sock over the foot. As yet another example, the image 120 may show an exposed or unclothed foot. The device 104 also communicates a query to the database 110 over the network 106. When the database 110 receives the query, the database 110 retrieves a 3D model 122 of the desired shoe, and communicates that model 122 to the device 104.

The device 104 applies a machine learning model 124 to the image 120 of the user's 102 foot to make predictions 125 of different aspects of the foot. These device 104 uses the predictions 125 and the 3D model 122 of the shoe to simulate the look and fit of the shoe on the user's 102 foot. In some embodiments, the machine learning model 124 includes several portions or sub-models that predict the different aspects of the user's 102 foot or the shoe. These aspects are related to the look and fit of the shoe on the user's 102 foot. The device 104 uses each of these different predictions 125 to simulate the look and fit of the shoe on the user's 102 foot.

The machine learning model 124 includes a backbone that extracts multiple features from the image 120 of the user's 102 foot. Additionally, the backbone may extract one or more features from the 3D model 122 of the shoe. These extracted features are shared and used by the multiple portions or sub-models of the machine learning model 124 to make their respective predictions 125. By first extracting features and then sharing those features amongst the portions or sub-models of the machine learning model 124, the device 104 reduces the computing resources needed to generate the various predictions 125 used to simulate the look and fit of the shoe on the user's 102 foot relative to other implementations that train or use separate machine learning models to generate each of the various predictions. In some instances, by reducing the computing resources needed to generate the predictions 125, the device 104 can use the machine learning model 124 to generate the predictions 125 without offloading some of the computation tasks to an external device or server.

The device 104 uses the predictions 125 to generate a two-dimensional (2D) model 126 of the shoe from the 3D model 122 of the shoe. For example, the device 104 may rotate the 3D model 122 of the shoe to align the 3D model 122 of the shoe with the user's 102 foot in the image 120. As another example, the device 104 may resize or scale the 3D model 122 of the shoe so that the 3D model 122 of the shoe fits over the user's 102 foot shown in the image 120. As yet another example, the device 104 may remove portions of the 3D model 122 of the shoe that would be occluded by other objects in the image 120 (e.g., the user's 102 leg). The device 104 may then flatten the 3D model 122 of the shoe to generate the 2D model 126 of the shoe. As a result, the 2D model 126 of the shoe may be a projection of the 3D model 122 of the shoe onto a 2D plane. The device 104 then simulates the look and fit of the shoe on the user's 102 foot by superimposing the 2D model 126 of the shoe onto the user's 102 foot shown in the image 120. The device 104 then displays the image 120 with the superimposed 2D model 126 of the shoe so that the user 102 may see how the shoe would look and fit on the user's 102 foot. The user 102 may then make a more informed decision when purchasing the shoe.

Figure 2:
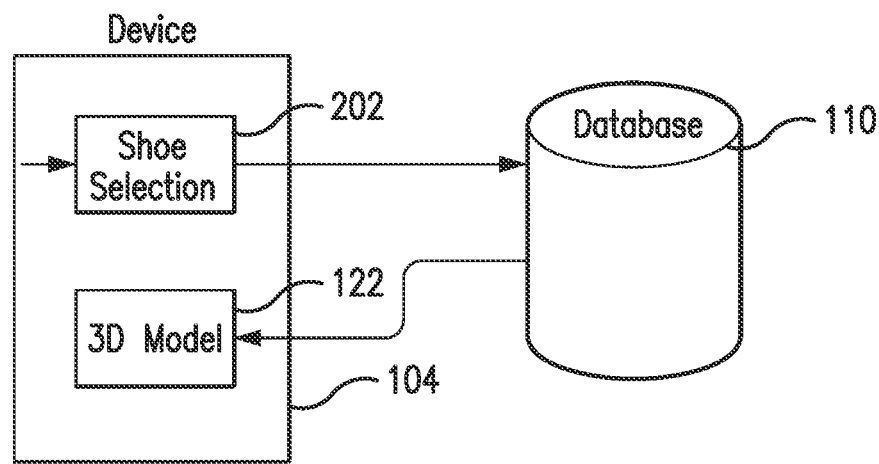
FIG. 2 illustrates an example device and database in the system of FIG. 1.

FIG. 2 illustrates an example device 104 and database 110 in the system 100 of FIG. 1. As seen in FIG. 2, the device 104 receives a shoe selection 202. For example, the device 104 may receive the shoe selection 202 when the user 102 selects a shoe that the user 102 wants to virtually try on. The device 104 may communicate the shoe selection 202 to the database 110. In some embodiments, the shoe selection 202 includes an identifier for the shoe that the user 102 desires. For example, the shoe selection 202 may include a name or model number of the desired shoe. The device 104 may communicate the shoe selection 202 to the database 110 as a query.

The database 110 uses the shoe selection 202 to query information stored in the database 110. Using the information in the shoe selection 202, the database 110 retrieves the 3D model 122 of the desired shoe, and communicates the 3D model 122 of the desired shoe to the device 104. The device 104 then processes the 3D model 122 of the shoe to simulate the look and fit of the shoe on the user's 102 foot.

Figure 3:
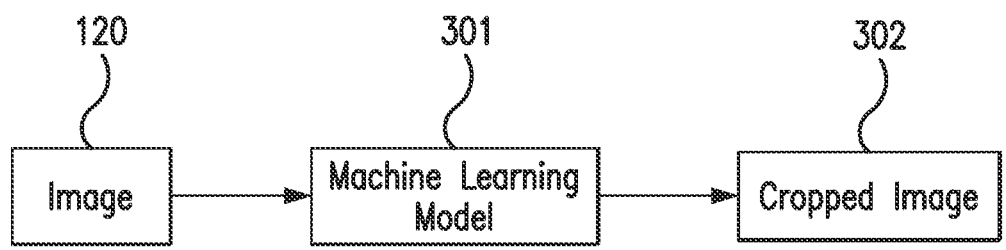
FIG. 3 illustrates an example device in the system of FIG. 1.

FIG. 3 illustrates an example device 104 in the system 100 of FIG. 1. As see in FIG. 3, the device 104 captures an image 120 (or a series of images 120) of the user's 102 foot. For example, the user 102 may point the camera 116 of the device 104 at the user's 102 foot. The user 102 then instructs the device 104 or the camera 116 to capture the image 120 or the series of images 120 of the user's 102 foot. The image 120 may show a top-down perspective of the user's 102 foot. Additionally, the image 120 may include other parts of the user's 102 body, such as the user's 102 leg. In some embodiments, the image 120 is taken and processed in real-time, and the device 104 does not save or store the image 120.

The device 104 applies a machine learning model 301 to the image 120 of the user's 102 foot to produce a cropped image 302 of the user's 102 foot. This machine learning model 301 may be the same or different from the machine learning model 124 that generates predictions used to simulate the look and fit of the shoe on the user's 102 foot. During the cropping process, the device 104 may remove or cut portions of the image 120 that are not relevant to the user's 102 foot. For example, if the user 102 did not capture the image 120 close to the user's 102 foot, then the image 120 may include portions of the environment surrounding the user's 102 foot. This surrounding environment may be extraneous to the user's 102 foot, and if left in the image 120, may throw off or negatively impact the predictions made by the machine learning model 124 to simulate the look and fit of the shoe on the user's 102 foot. By removing this extraneous information from the image 120 through the cropping process, the device 104 may improve the accuracy of the predictions generated by the machine learning model 124.

The machine learning model 301 may analyze the image 120 to identify the boundaries of the user's 102 foot in the image 120. For example, the machine learning model 301 may use image analysis techniques or computer vision techniques to identify the boundaries of the user's 102 foot. The device 104 may then use these predicted boundaries to crop or remove portions of the image 120 that are outside and distant from the boundary of the foot. In some embodiments, the machine learning model 124 includes the machine learning model 301 as a portion or sub-model that is used to crop the image 120 of the user's 102 foot.

Figure 4:
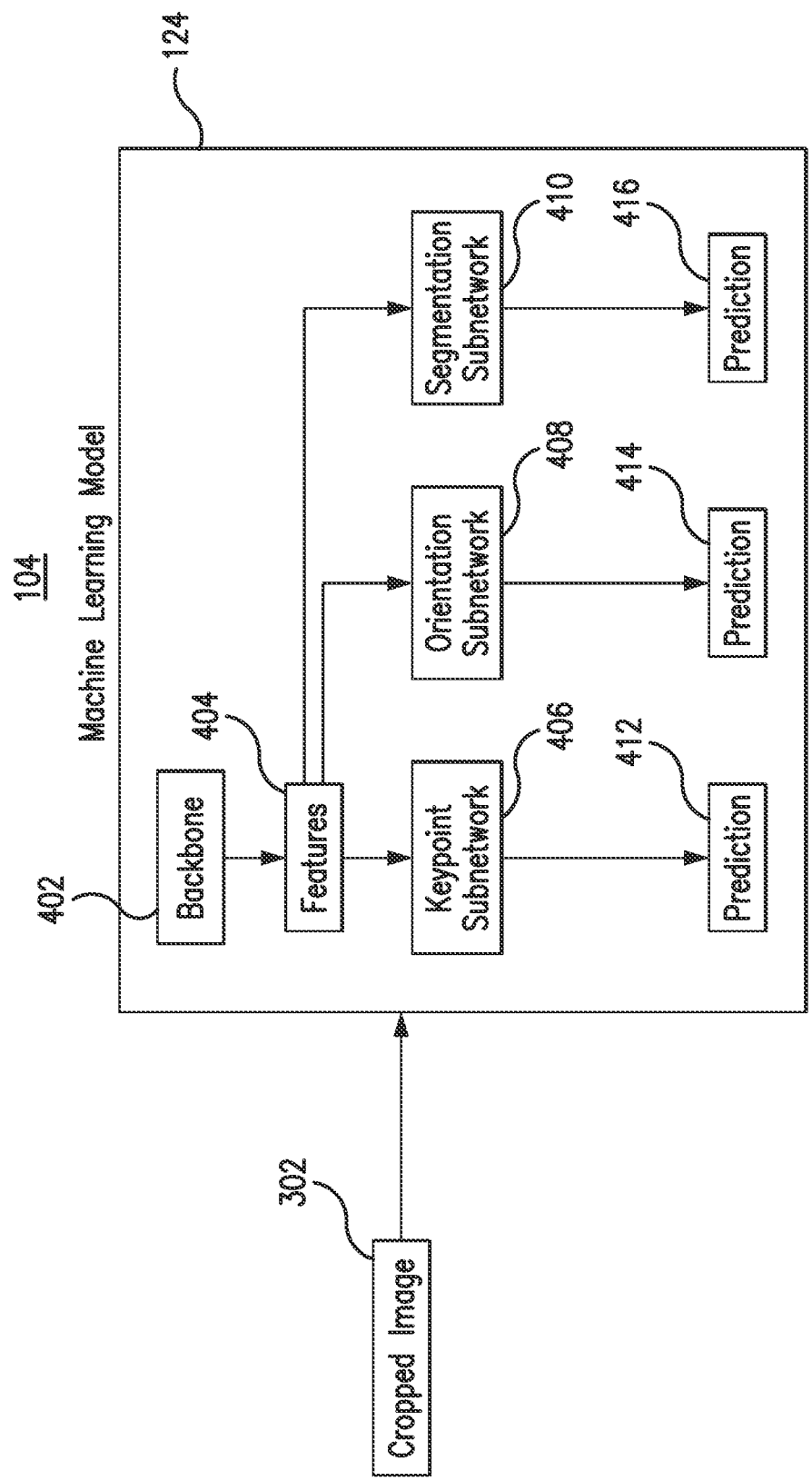
FIG. 4 illustrates an example device in the system of FIG. 1.

FIG. 4 illustrates an example device 104 in the system 100 of FIG. 1. Generally, FIG. 4 illustrates the device 104 applying the machine learning model 124 to generate different predictions that are used to simulate the look and fit of a shoe on the user's 102 foot. As see in FIG. 4, the device 104 applies the machine learning model 124 to the cropped image 302 of the user's 102 foot. In some embodiments, the device 104 applies the machine learning model 124 to the image 120 of the user's 102 foot capture by the camera 116.

The machine learning model 124 includes a backbone 402 and multiple portions or sub-models. For example, the machine learning model 124 may be a deep neural network that includes multiple subnetworks. Each of the subnetworks analyze different information to predict different aspects of the foot. The backbone 402 may generate the information used by the different subnetworks of the machine learning model 124. The subnetworks may share the information generated by the backbone 402. In this manner, the device 104 generates different predictions by training and using only one machine learning model 124 rather than training and using multiple machine learning models to make the predictions. As a result, the device 104 reduces the computing resources needed to implement the virtual shoe try-on feature so the device does not need to offload some of the computation tasks to an external device or server, in certain embodiments.

The backbone 402 may be a feature extractor that extracts one or more features 404 of the user's 102 foot from the cropped image 302. The portions or sub-models of the machine learning model 124 may use one or more of the features 404 extracted by the backbone 402, to generate different predictions pertaining to the user's 102 foot or the shoe.

For example, the backbone 402 may be trained to identify the boundary of the user's 102 foot in the cropped image 302. The boundary may be represented by a series of points that establish the boundary of the user's 102 foot. For example, the backbone 402 may extract a series of coordinates for these points that establish the boundary of the user's 102 foot. In certain embodiments, the backbone 402 may use computer vision or image analysis techniques to identify the foot in the cropped image 302. The backbone 402 may be trained to identify the foot based on the size and shape of the foot, and based on the color of the foot contrasting with the surrounding environment in the cropped image 302. As another example, the backbone 402 may be trained to identify the boundary of other parts of the user's 102 body in the cropped image 302, such as the user's 102 leg. As a result, the features 404 may also include coordinates representing the boundary of the user's 102 leg.

In some embodiments, the backbone 402 is trained to learn which features 404 to extract from the cropped image 302. For example, the backbone 402 may learn which features 404 help the sub-models (e.g., subnetworks) generate more accurate predictions by extracting different features 404 from the cropped image 302 and seeing if those features 404 improve the accuracy of the sub-models' predictions. If the features 404 improve the accuracy of the predictions, then the backbone 402 may learn to extract those features 404 in the future. If the features 404 do not improve the accuracy of the predictions, then the backbone 402 may learn to ignore those features 404 in the future. As a result, the backbone 402 may be trained to extract any suitable features 404 from the cropped image 302.

The machine learning model 124 may include any suitable number of subnetworks that predict any suitable aspects of the foot or shoe that are used to simulate the look and fit of the shoe on the user's 102 foot. As seen in FIG. 4, the machine learning model 124 includes a keypoint subnetwork 406, an orientation subnetwork 408, and a segmentation subnetwork 410. Each of these subnetworks 406, 408, and 410 use one or more of the features 404 extracted by the backbone 402 to generate one or more predictions 412, 414, and 416. Each of these predictions 412, 414, and 416 pertain to a different aspect of the user's 102 foot or the shoe. The device 104 may use these predictions 412, 414, and 416 to simulate the look and fit of the shoe on the user's 102 foot. These subnetworks may be any suitable type. For example, the subnetworks may be one or more of a simple regression model with a fully connected layers, a feature pyramid network, or a decoder.

The keypoint subnetwork 406 analyzes the boundary of the user's 102 foot to predict coordinates of key or important portions of the user's 102 foot. For example, this subnetwork 406 may predict the coordinates of each of the user's 102 toes and coordinates for the user's 102 heel and ankle. These coordinates may be used to size and scale the 3D model 122 of the shoe so that the shoe fits appropriately over the user's 102 foot. For example, the device 104 may use the coordinates of the important or key structures of the user's 102 foot to scale the model 122 of the shoe so that the shoe extends slightly past the toes on the user's 102 foot and slightly behind the heel of the user's 102 foot. In an example, the coordinates for the boundary of the user's 102 foot in the features 404 may indicate a size and shape of the user's 102 foot. The keypoint subnetwork 406 may analyze the size or shape of the foot to predict where certain structures of the foot (e.g., toes, ankle, and heel) are located. The prediction 412 generated by the keypoint subnetwork 406 may include the predicted coordinates of these structures.

The orientation subnetwork 408 may analyze portions of the boundary of the foot to predict an orientation of the foot in the cropped image 302. The orientation subnetwork 408 may analyze portions of the foot to determine if the foot is oriented at an angle relative to a particular axis in space in the cropped image 302. For example, by analyzing a left and right boundary of the foot in the cropped image 302, the orientation subnetwork 408 may generate the prediction 414 that the foot is turned towards the left or the right in the cropped image 302. The device 104 may use the predicted orientation of the foot to rotate the model of the shoe such that the model of the shoe aligns properly with the foot in the cropped image 302.

The segmentation subnetwork 410 analyzes the boundary of the foot and the boundary of the user's 102 leg in the cropped image 302 to predict portions of the foot that will be occluded by the user's 102 leg (or another object in the image 120 such as clothing on the user's 102 leg). For example, the segmentation subnetwork 410 may analyze the boundary of the user's 102 foot and the boundary of the user's 102 leg to determine points along the user's 102 leg that will cover a portion of the user's 102 foot when viewed from the perspective of the cropped image 302. The segmentation subnetwork 410 then generates the prediction 416 of the coordinates along the user's 102 foot that will be occluded by the user's 102 leg. The device 104 may use these predicted coordinates to determine the corresponding portions of the 3D model 122 of the shoe that will be occluded by the user's 102 leg. For example, the device 104 may determine the portions of the 3D model 122 of the shoe that will overlap with the occluded portions of the foot when the 3D model 122 of the shoe is aligned with the foot. The device 104 may then remove these portions from the 3D model 122 of the shoe. The device 104 then removes from the 3D model 122 of the shoe the portions that will be occluded by the user's 102 leg. In this manner, the device 104 removes portions of the 3D model 122 of the shoe that will not be visible when the shoe is superimposed onto the image of the user's 102 foot.

The machine learning model 124 is not limited to the particular subnetworks shown in FIG. 4. For example, the machine learning model 124 may include a classification subnetwork that analyzes one or more features 404 extracted by the backbone 402 to classify the user's 102 foot. The classification subnetwork 406 may examine various portions of the boundary of the user's 102 foot to predict whether the user's 102 foot in the cropped image 302 is a left foot or a right foot. The classification subnetwork may examine the parts of the boundary of the user's 102 foot to determine a general shape of the user's 102 foot. Then, based on this general shape of the user's 102 foot, the classification network generates the prediction 412 of whether the foot in the cropped image 302 is a left foot or a right foot. For example, the classification subnetwork may determine from the boundary of the foot that a left portion of the foot extends further out than a right portion of the foot. In response, the classification subnetwork may predict that the foot is a right foot. Alternatively, the classification subnetwork may determine from the boundary of the foot that a right portion of the foot extends further out than a left portion of the foot. In response, the classification subnetwork may predict that the foot is a left foot. By predicting whether the foot is a left foot or a right foot, the device 104 may select the appropriate model for a left shoe or a right shoe.

The machine learning model 124 may include subnetworks that predict confidence scores or confidence intervals for other predictions made by the machine learning model 124. For example, the machine learning model 124 may include a segmentation confidence subnetwork that predicts a confidence score indicating an accuracy or reliability of the prediction 416 made by the segmentation subnetwork 410. As another example, the machine learning model 124 may include an orientation confidence subnetwork that predicts a confidence score indicating an accuracy or reliability of the prediction 414 made by the orientation subnetwork 408. In some embodiments, the confidence scores may be used by the device 104 to determine whether the machine learning model 124 should receive further training. For example, low confidence scores may indicate that the performance of the machine learning model 124 may be improved with further training. In response, the device 104 may further train the machine learning model 124.

The machine learning model 124 may also include a subnetwork that uses the boundaries of the foot and the boundaries of the shoe to predict where the foot will contact the shoe when the user 102 is wearing the shoe. For example, the subnetwork may predict where the boundary of the foot and the boundary of the shoe will overlap or touch each other when the shoe is fitted onto the foot. The subnetwork may also predict an amount of pressure that the shoe will exert on the foot at these contact points. This information may then be presented to the user 102 when the user 102 is viewing the image 120 of the 2D model 126 of the shoe superimposed on the user's 102 foot. By viewing this information, the user 102 may determine whether the shoe will fit comfortably on the user's 102 foot, which helps the user 102 decide whether to purchase the shoe, in certain embodiments.

Figure 5:
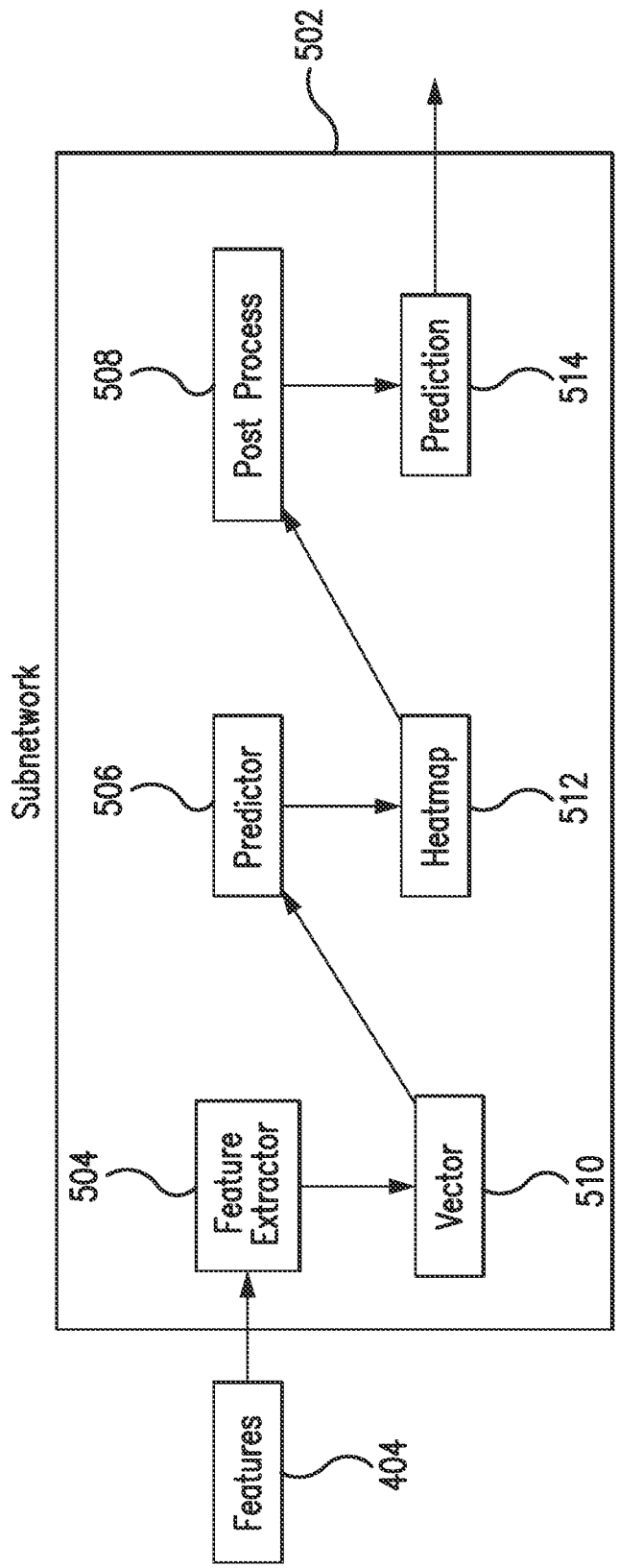
FIG. 5 illustrates an example subnetwork in the system of FIG. 1.

FIG. 5 illustrates an example subnetwork 502 in the system 100 of FIG. 1. Each of the subnetworks described with respect to FIG. 4 may include the components of the subnetwork 502. As seen in FIG. 5, the subnetwork 502 receives one or more features 404 extracted by the backbone 402. The features 404 may describe any suitable aspect of the user's 102 foot in an image 120 or cropped image 302. For example, the features 404 may include coordinates that establish the boundary of the user's 102 foot in the image 120 or cropped image 302. As seen in FIG. 5, the subnetwork 502 includes a feature extractor 504, a predictor 506 and a post process 508. These components of the subnetwork 502 work together to generate a prediction 514 from the one or more features 404.

The feature extractor 504 vectorizes one or more of the features 404. For example, the feature extractor 504 may generate a vector 510 that is a numerical representation of one or more of the features 404. The vector 510 may include multiple numerical entries representing one or more of the features 404. The vector 510 may make it easier to analyze the features 404 that are relevant to the prediction 514 being generated by the subnetwork 502.

The predictor 506 analyzes the vector 510 to generate a heatmap 512. The heatmap 512 may indicate ranges or distributions of predictions and their likelihoods of being accurate. For example, if the subnetwork 502 is the segmentation subnetwork 410 that predicts portions of the user's 102 foot that will be occluded by the user's 102 leg, the heatmap 512 may indicate the likelihood that certain regions of the user's 102 foot will be occluded by the user's 102 leg. Certain portions may be more likely to be occluded, while other portions may be less likely to be occluded. As another example, if the subnetwork 502 is the keypoint subnetwork 406 that predicts the locations of certain structures of the user's 102 foot, the heatmap 512 may indicate the likelihood that certain regions of the user's 102 foot include one of these structures. Certain regions may be more likely to be one of the structures, while other regions may be less likely to be one of the structures.

The post process 508 analyzes the heatmap 512 to generate the prediction 514. The prediction 514 may be based on the range or distribution in the heatmap 512 that exceeds certain thresholds. Using the previous example, if the subnetwork 502 is the segmentation subnetwork 410, the post process 508 may analyze the heatmap 512 to identify the portions of the user's 102 foot that have a likelihood of being occluded by the user's 102 leg or a likelihood of being occluded by apparel on the user's 102 leg that exceeds a threshold. The post process 508 may identify these portions from the heatmap 512 and determine coordinates for these portions. The prediction 514 may include these coordinates that indicate the portions of the user's 102 foot. As another example, if the subnetwork 502 is the keypoint subnetwork 406, the post process 508 may analyze the heatmap 512 to identify the regions of the user's 102 foot that have a likelihood of being a key structure (e.g., toes, ankle, and heel) that exceeds a threshold. The post process 508 may identify these regions from the heatmap 512 and determine coordinates for these regions. The prediction 514 may include these coordinates that indicate the locations of key structures on the user's 102 foot.

Some subnetworks may not include every component shown in the example of FIG. 5. For example, the orientation subnetwork and the classification subnetwork may not include the post process 508. Instead, the predictor 506 directly generates the prediction 514 based on the vector 510. For example, the predictor 506 may multiply the vector 510 with a matrix to generate the prediction 514 (e.g., a predicted orientation of the foot or a prediction whether the foot is a left foot or a right foot).

Figure 6:
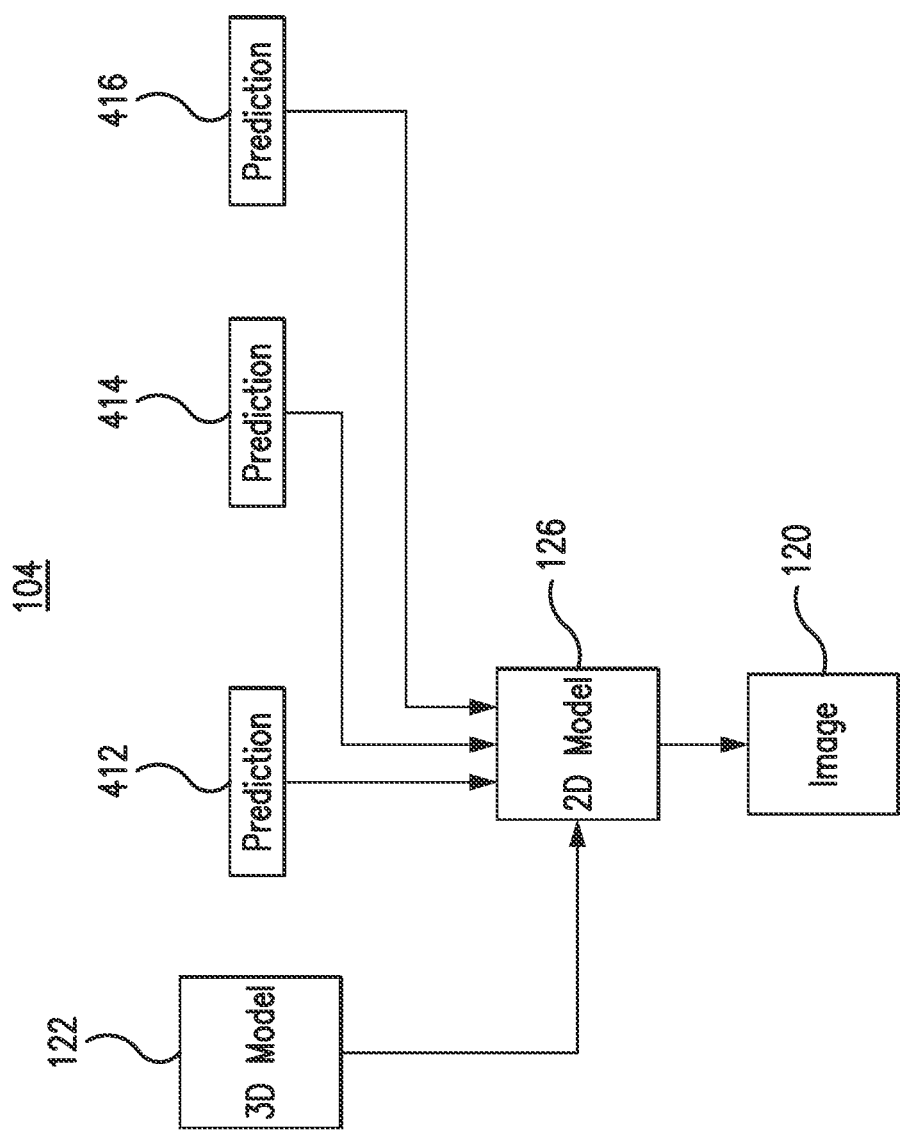
FIG. 6 illustrates an example device in the system of FIG. 1.

FIG. 6 illustrates an example device 104 in the system 100 of FIG. 1. As seen in FIG. 6, the device 104 uses one or more predictions 412, 414, and 416 generated by the subnetworks of the machine learning model 124 to generate a 2D model 126 of the shoe based on the 3D model 122 of the shoe. For example, the device 104 may use one or more of the predictions 412, 414, and 416 to rotate or orient the 3D model 122 of the shoe to align the 3D model 122 of the shoe with the user's 102 foot in the image 120 or cropped image 302. As another example, the device 104 may use one or more of the predictions 412, 414, and 416 to scale or resize the 3D model 122 of the shoe so that the shoe fits over the user's 102 foot shown in the image 120 or the cropped image 302. As yet another example, the device 104 may use one or more of the predictions 412, 414, and 416 to remove portions from the 3D model 122 of the shoe that will be occluded by the user's 102 leg in the image 120 or cropped image 302.

After performing these operations on the 3D model 122 of the shoe, the device 104 generates a 2D model 126 of the shoe from the 3D model 122 of the shoe. For example, the device 104 may view the 3D model 122 of the shoe from the perspective shown in the image 120 or the cropped image 302. The device 104 may then flatten the 3D model 122 of the shoe from this perspective to generate the 2D model 126 of the shoe. In this manner, the 2D model 126 of the shoe may be a projection of the 3D model 122 onto a 2D plane. As a result, the 2D model 126 of the shoe may be aligned with the user's 102 foot in the image 120 or the cropped image 302. Additionally, the 2D model 126 of the shoe may be scaled or sized to fit on the user's 102 foot shown in the image 120 or the cropped image 302. Moreover, portions of the 2D model 126 of the shoe that would be occluded by the user's 102 leg are removed.

The device 104 then superimposes the 2D model 126 of the shoe onto the image 120 of the user's 102 foot or the cropped image 302 of the user's 102 foot. For example, the device 104 may position the 2D model 126 of the shoe onto the user's 102 foot shown in the image 120 or the cropped image 302. The 2D model 126 of the shoe would then cover the user's 102 foot. When the user 102 views the image 120, the user 102 may see how the shoe would look and fit on the user's 102 foot.

Figure 7:
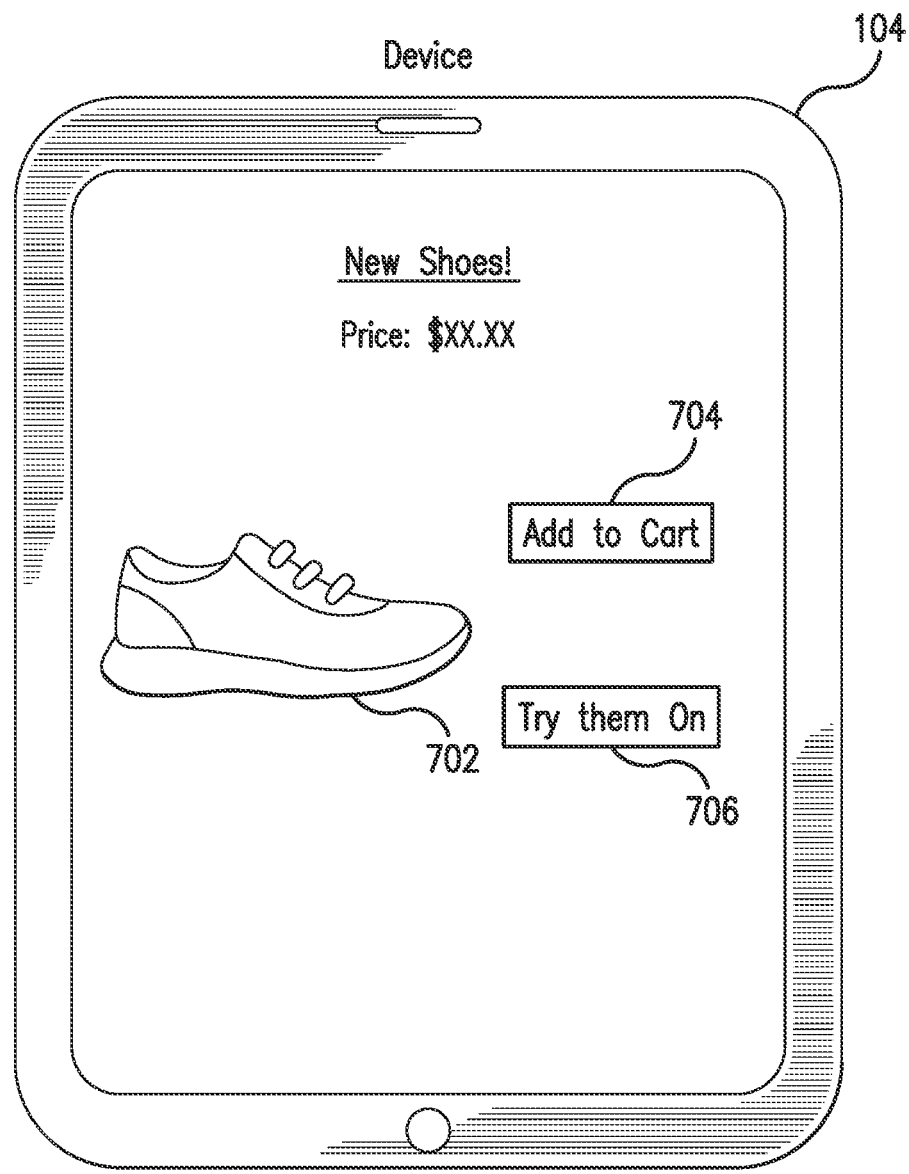
FIG. 7 illustrates an example device in the system of FIG. 1.

FIG. 7 illustrates an example device 104 in the system 100 of FIG. 1. As seen in FIG. 7, the device 104 is being used to shop for shoes online. The device 104 shows a product listing for a shoe. The listing includes an image 702 of the shoe along with a price for the shoe. Additionally, the device 104 presents a button 704 and a button 706. If the button 704 is activated or pressed by a user 102, the device 104 communicates a message requesting that the shoe be added to a virtual shopping cart of the user 102. The user 102 may then checkout and purchase the shoe.

If the user 102 activates or presses the button 706, the device 104 may begin the virtual shoe try-on process to simulate the look and fit of the shoe on the user's 102 foot. By providing this feature, the device 104 allows the user 102 to see how the shoe looks on the user's 102 foot before the user 102 commits to purchasing the shoe. In this manner, the device 104 reduces the likelihood that the user 102 will be dissatisfied with the shoe purchase and the likelihood that the user 102 will return the shoe. As a result, the device 104 improves the satisfaction of the user 102 and conserves shipping resources, such as packaging materials and fuel, in particular embodiments.

Figure 8:
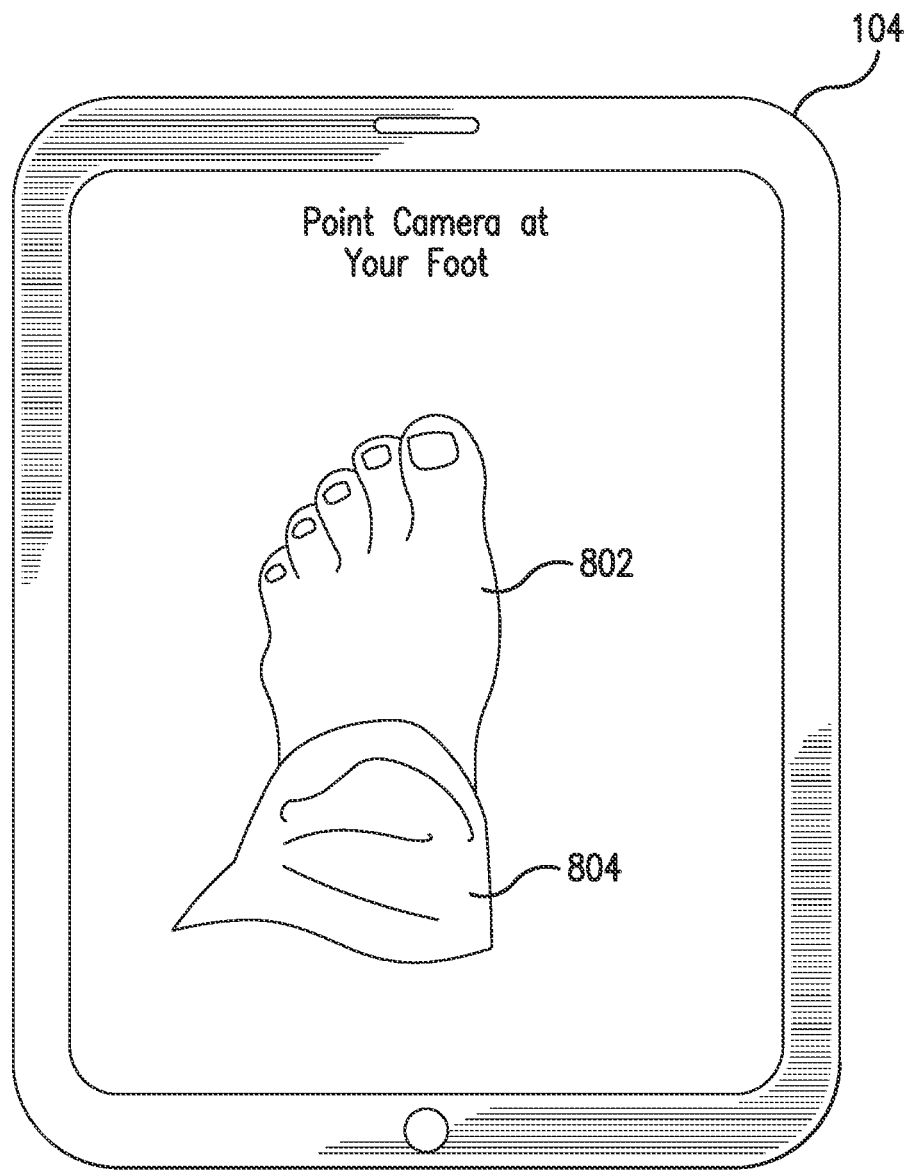
FIG. 8 illustrates an example device in the system of FIG. 1.

FIG. 8 illustrates an example device 104 in the system 100 of FIG. 1. As seen in FIG. 8, the device 104 requests that the user 102 point the camera of the device 104 at the user's 102 foot after the user 102 presses or activates the button 706 to begin the virtual shoe try-on process. The image captured by the user 102 includes the user's foot 802 and a portion of the user's leg 804. Additionally, the perspective of the user's foot 802 shown in the image is a top-down perspective of the foot 802. In some embodiments, the device 104 receives an image or video of the foot in real-time as the user 102 points the camera at the foot. The device 104 may simulate the look and fit of the shoe on the real-time image or video of the foot.

In some embodiments, after the user 102 presses or activates the button 706 to begin the virtual shoe try-on feature, the device 104 communicates a message to the database 110 to retrieve a 3D model 122 of the shoe in the product listing. The database 110 retrieves the 3D model 122 of the shoe and communicates the 3D model 122 of the shoe to the device 104. The device 104 then uses the 3D model 122 of the shoe for the virtual try-on process.

Figure 9:
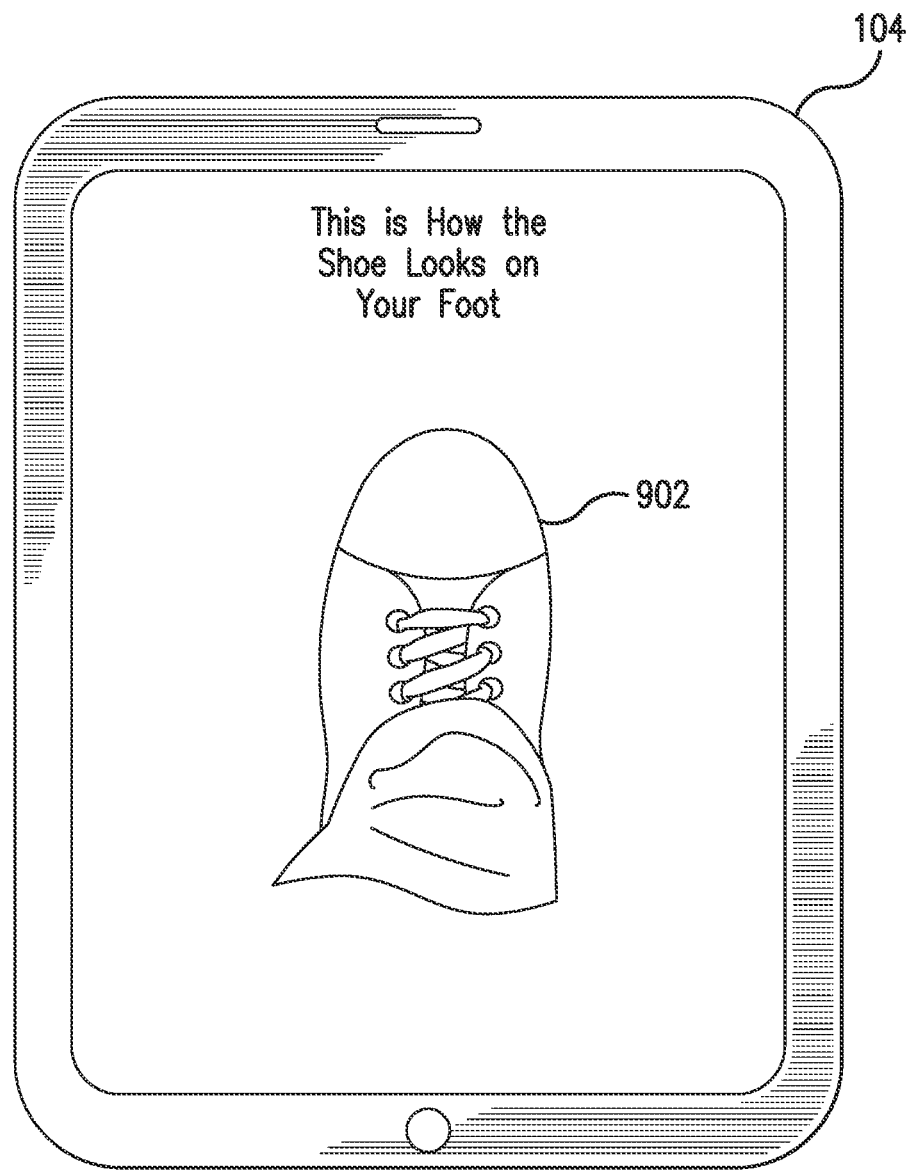
FIG. 9 illustrates an example device in the system of FIG. 1.

FIG. 9 illustrates an example device 104 in the system 100 of FIG. 1. As seen in FIG. 9, the device 104 has processed the image of the user's foot 802 and the 3D model 122 of the shoe. The device 104 has generated a 2D model 126 of the shoe and superimposed the 2D model 126 of the shoe onto the image 120 of the user's 102 foot. The device 104 then presents an image 902 showing the 2D model 126 of the shoe superimposed onto the user's 102 foot. In some embodiments, the image 902 is a real-time image of the foot, and the device 104 superimposes the 2D model 126 of the shoe onto the real-time image of the foot. When the user views the device 104, the user sees how the shoe looks and fits on the user's 102 foot. The user 102 may then evaluate whether the user 102 wants to purchase the shoe.

Figure 10:
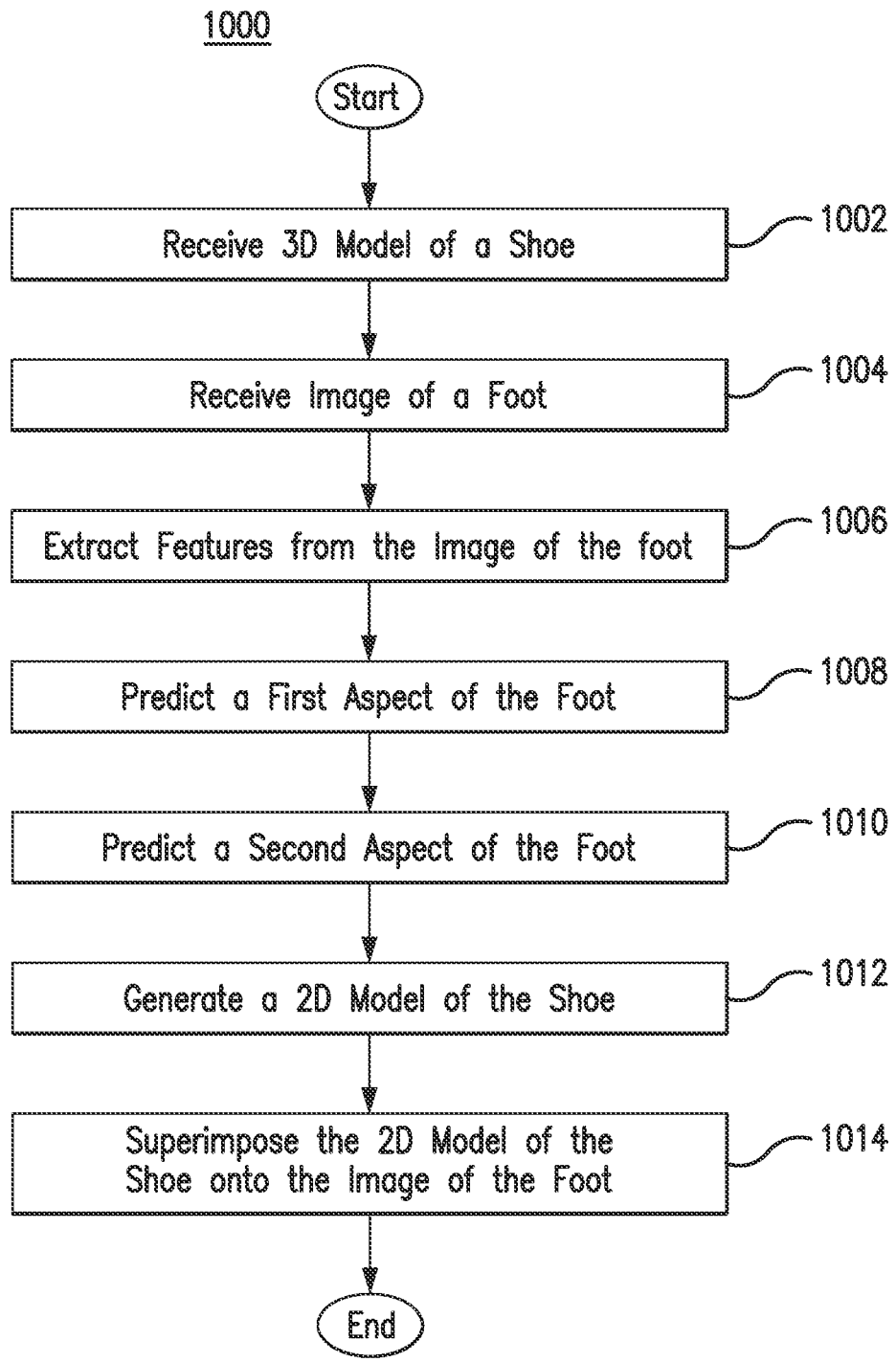
FIG. 10 is a flowchart of an example method performed in the system of FIG. 1.

FIG. 10 is a flowchart of an example method 1000 performed in the system 100 of FIG. 1. In certain embodiments, the device 104 performs the method 1000. By performing the method 1000, the device 104 applies a machine learning model 124 with several portions or sub-models that generate different predictions relating to a user's 102 foot or a 3D model 122 of a shoe desired by the user 102. The device 104 then uses these predictions to simulate the look and fit of the shoe on the user's 102 foot before the user 102 commits to purchasing the shoe.

In block 1002, the device 104 receives a 3D model 122 of a shoe. In certain embodiments, the device 104 may receive the 3D model 122 of the shoe from the database 110 in response to a query communicated from the device 104 to the database 110. The device 104 may have generated the query in response the user 102 activating or pressing a button 706 to begin a virtual shoe try-on feature. The device 104 may include in the query an identifier for a shoe that the user 102 wants to virtually try-on. The database 110 may retrieve and communicate the 3D model 122 of the shoe that matches the identifier in the query.

In block 1004, the device 104 receives an image 120 of the user's 102 foot. The device 104 may instruct the user 102 to take a picture of the user's 102 foot using the camera 116 of the device 104. The user 102 may point the camera 116 of the device 104 at the user's 102 foot to capture the image 120 of the user's 102 foot.

In block 1006, the device 104 extracts features from the image 120 of the user's 102 foot. For example, the device 104 may use a backbone 402 of a machine learning model 124 to extract one or more features 404 pertaining to the user's 102 foot. These features 404 may include any feature of the user's 102 foot shown in the image 120. For example, the features 404 may include coordinates that establish a boundary of the user's 102 foot in the image 120. As another example, the features 404 may include coordinates that establish a boundary of the shoe in the 3D model 122. As yet another example, the features 404 may include coordinates that establish a boundary of other portions of the user's 102 body in the image 120 (e.g., the user's 102 leg). These features 404 may then be used by multiple portions or sub-models of the machine learning model 124 to make predictions pertaining to the user's 102 foot or the shoe.

In block 1008, the device 104 predicts a first aspect of the user's 102 foot using one or more of the extracted features 404. For example, the device 104 may predict the positions or locations of important or key structures of the user's 102 foot (e.g., the user's 102 toes, ankle or heel). This information may later be used to appropriately size or scale the model of the shoe that fits on to the user's 102 foot.

In block 1010, the device 104 predicts a second aspect of the user's 102 foot. For example, the device 104 may use an orientation sub-model or subnetwork 408 to predict an orientation of the user's 102 foot in the image 120 based on one or more of the extracted features 404. This predicted orientation may then be used to rotate or orient the model of the shoe so that the model of the shoe is aligned with the user's 102 foot in the image 120. In some embodiments, blocks 1008 and 1010 are performed in parallel.

In some embodiments, the device 104 may predict additional aspects of the user's 102 foot using other portions or sub-models of the machine learning model 124. For example, the device 104 may use a segmentation sub-model or subnetwork 410 to predict portions of the 3D model 122 of the shoe that will be occluded by the portions of the user's 102 leg (or apparel on the user's 102 leg) included in the image 120. These predictions may then be used to remove portions from the 3D model 122 of the shoe that will be occluded. As another example, the device 104 may use a classification sub-model or subnetwork to predict whether the user's 102 foot shown in the image 120 is a left foot or a right foot. The prediction may then be used to verify that the appropriate left or right shoe is represented by the 3D model 122 of the shoe.

In block 1012, the device 104 generates a 2D model 126 of the shoe. In some embodiments, the device 104 generates the 2D model 126 of the shoe from the 3D model 122 of the shoe. The device 104 may rotate or orient the 3D model 122 of the shoe to align the 3D model 122 of the shoe with the user's 102 foot shown in the image 120. The device 104 may scale or resize the 3D model 122 of the shoe so that the 3D model 122 of the shoe fits or follows the boundary of the user's 102 foot in the image 120. The device 104 may also remove from the 3D model 122 of the shoe portions of the 3D model 122 of the shoe that will be occluded by the portions of the user's 102 leg or by apparel on the user's 102 leg shown in the image 120. After orienting, resizing, and cutting the 3D model 122 of the shoe, the device 104 flattens the 3D model 122 of the shoe to generate the 2D model 126 of the shoe.

In block 1014, the device 104 superimposes the 2D model 126 of the shoe onto the image 120 of the user's 102 foot. In this manner, the device 104 simulates the look and fit of the shoe on the user's 102 foot shown in the image 120. By viewing the image 120, the user 102 may understand how the shoe will look and fit on the user's 102 foot before the user 102 commits to purchasing the shoe, in certain embodiments.

In embodiments where the user 102 has captured a series of images 120 of the user's 102 foot (e.g., multiple frames of a video of the user's 102 foot), the device 104 may apply the machine learning model 124 to the frames to make predictions for each of the frames. The device 104 may then generate a 2D model 126 of the shoe for each frame based on the predictions for the respective frame. The device 104 superimposes the 2D models 126 onto the respective frames to simulate the look and fit of the shoe on the user's 102 foot. In this manner, the device 104 can continuously and accurately simulate the look and fit of the shoe on the user's 102 foot even as the user 102 moves or turns the foot in the video. As an example, if the user 102 turns or rotates the foot to see the underside of the foot, the device 104 would generate predictions that cause the 3D model 122 of the shoe to rotate towards the underside of the shoe. The device 104 would generate 2D models 126 based on the rotation of the 3D model 122 and then superimpose the 2D models 126 onto the frames of the rotating foot. The user 102 would then be able to see how the underside of the shoe looks and fits on the user's 102 foot. The process of generating the predictions and the 2D models 126 may be sufficiently fast that the user 102 perceives the shoe as rotating or turning with the user's 102 foot in the video.

The blocks of the method 1000 may be performed in any suitable order and not necessarily in the order shown in FIG. 10. For example, some of the blocks may be performed in parallel with each other rather than in sequence. As another example, some of the blocks may be performed out of order.

Figure 11:
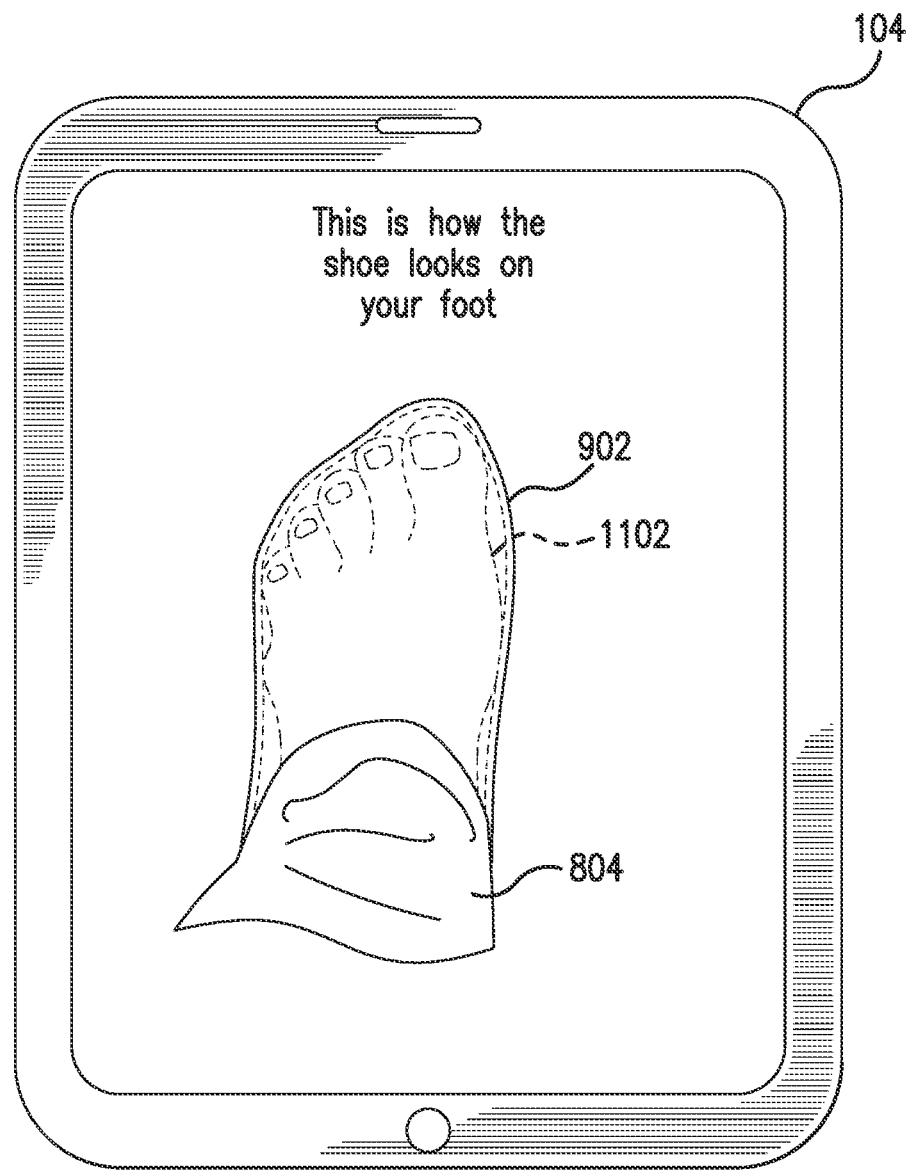
FIG. 11 illustrates an example device in the system of FIG. 1.

FIG. 11 illustrates an example device in the system of FIG. 1. As seen in FIG. 11, the device 104 shows the image 902 of the shoe on the user's 102 foot. Additionally, the device 104 shows a phantom view 1102 of the user's 102 foot within the shoe (e.g., by using dashed or dotted lines). By showing the foot within the shoe, the device 104 shows the user 102 how the show will fit over the user's 102 foot. This information may assist the user 102 decide whether to purchase the shoe, in certain embodiments. The user 102 may enable and disable the phantom view using a setting on the device 104 or in the application 118.

Figure 12:
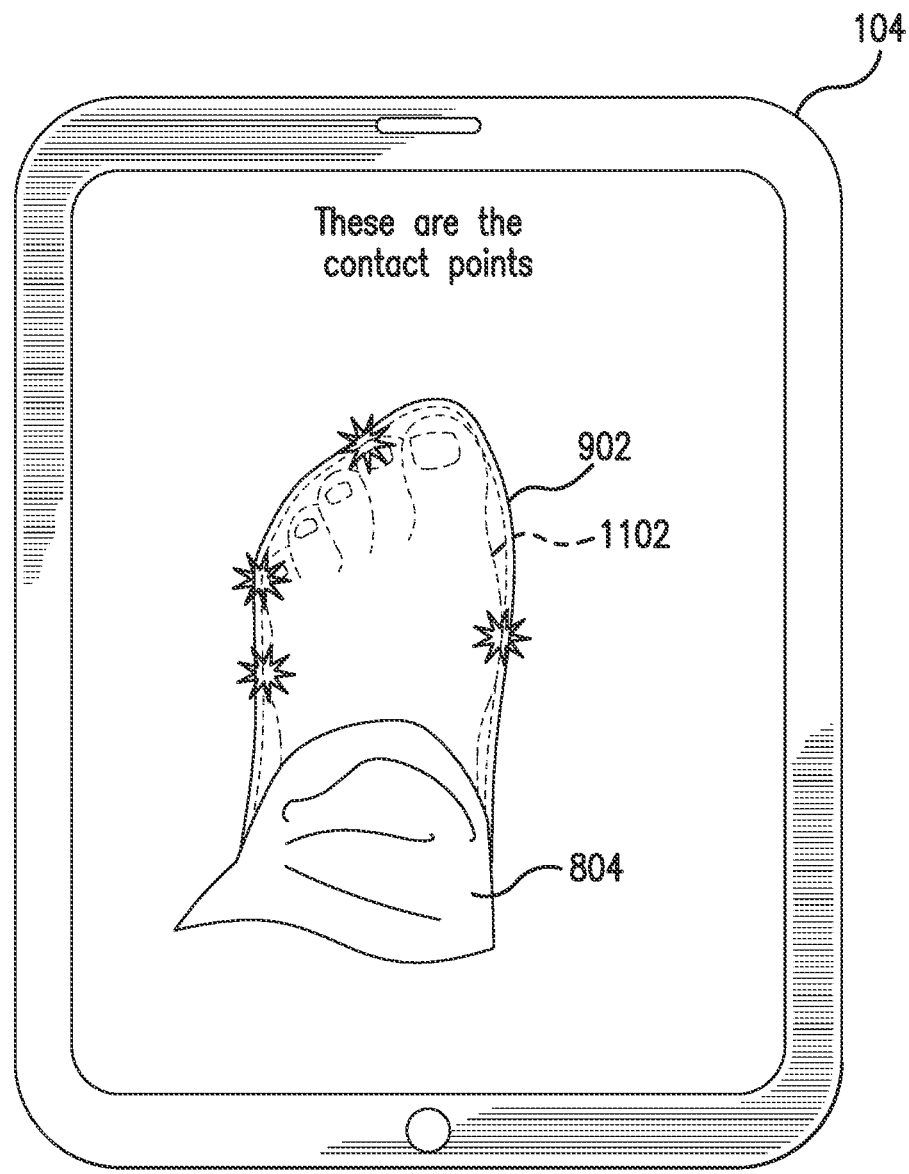
FIG. 12 illustrates an example device in the system of FIG. 1.

FIG. 12 illustrates an example device in the system of FIG. 1. As seen in FIG. 12, the device 104 may show the phantom view 1102 of the user's 102 foot in the image 902 of the shoe. Additionally, the device 104 may indicate contact points or pressure points on the user's 102 foot caused by the shoe. As discussed previously, the machine learning model 124 may include a subnetwork that uses the determined boundaries of the user's 102 foot and the shoe to predict where the user's 102 foot will contact the shoe when the shoe is fitted over the user's 102 foot. This subnetwork may also predict the pressure that the shoe will put on these contact points. The device 104 may show indicators (e.g., a star or other marking) on these contact points to show the user 102 where the shoe is predicted to put pressure on the user's 102 foot. The user may use this information when evaluating whether to purchase the shoe, in certain embodiments.

In summary, the system 100 implements an approach in which one machine learning model 124 is trained to make the different types of predictions. The machine learning model 124 (e.g., a neural network) includes a backbone 402 that extracts several features 404 that are used to make subsequent predictions. For example, the backbone 402 may analyze an image 120 of a user's 102 foot to extract features 404 of the foot (e.g., coordinates of the boundaries of the foot, the shape of the foot, the size of the foot). As another example, the backbone 402 may analyze a model 122 of a shoe to extract features 404 of the shoe (e.g., coordinates of the boundaries of the shoe, the shape of the shoe, the size of the shoe). These features 404 are then shared amongst other portions (e.g., subnetworks) of the machine learning model 124. These portions each use one or more of the extracted features 404 to predict a different aspect of the foot or the shoe. For example, one portion of the machine learning model 124 may use one or more the extracted features 404 to predict an orientation of the foot. As another example, another portion of the machine learning model 124 may use one or more of the extracted features 404 to predict portions of the model 122 of the shoe that will be occluded by the user's 102 leg. As yet another example, another portion of the machine learning model 124 may use one or more of the extracted features 404 to predict whether the foot is a right or left foot. These predictions are used to generate a 2D model 126 of the shoe, and the 2D model 126 of the shoe is then superimposed onto the image 120 of the user's 102 foot. In this manner, the user 102 can see what the shoe will look like on the user's 102 foot. As a result of training one model 124 to make the various predictions, the virtual shoe try-on feature may consume less computing resources, which allows certain devices 104 (e.g., a mobile device of the user) to implement the virtual shoe try-on feature, in certain embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The embodiments of the present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A method for fitting a virtual shoe onto a foot, the method comprising:
   receiving, from a database, a three-dimensional model of a shoe;
   receiving, at a backbone of a neural network, an image of a foot, wherein the image further includes at least one of a portion of a leg or a portion of clothing;
   extracting, using the backbone of the neural network, a plurality of features from the image of the foot;
   predicting, using a first subnetwork of the neural network and based on one or more features of the plurality of features, a first aspect of the foot;
   predicting, using a second subnetwork of the neural network and based on one or more features of the plurality of features, a second aspect of the foot different from the first aspect, wherein the second aspect is a portion of the foot that will be occluded by at least one of the portion of the leg or the portion of clothing;
   generating, using at least the first aspect, the second aspect, and the three-dimensional model of the shoe, a two-dimensional model of the shoe, wherein generating the two-dimensional model of the shoe comprises removing, from the three-dimensional model of the shoe, a portion of the three-dimensional model of the shoe corresponding to at least one of the portion of the leg or the portion of clothing; and
   superimposing the two-dimensional model of the shoe onto the image of the foot.

2. The method of claim 1, wherein the first aspect is an orientation of the foot in the image, and wherein generating the two-dimensional model of the shoe comprises rotating the three-dimensional model of the shoe or the two-dimensional model of the shoe to align the three-dimensional model of the shoe or the two-dimensional model of the shoe with the orientation of the foot in the image.

3. The method of claim 1, further comprising predicting, using a third subnetwork of the neural network and based on one or more features of the plurality of features, whether the foot in the image is a right foot or a left foot.

4. A method comprising:
   extracting, using a backbone of a machine learning model, a plurality of features from an image of a foot, wherein the image further includes at least one of a portion of a leg or a portion of clothing;
   predicting, using a first portion of the machine learning model and based on one or more features of the plurality of features, a first aspect of the foot;
   predicting, using a second portion of the machine learning model and based on one or more features of the plurality of features, a second aspect of the foot different from the first aspect, wherein the second aspect is a portion of the foot that will be occluded by at least one of the portion of the leg or the portion of the clothing;
   generating, using at least the first aspect and the second aspect, a two-dimensional model of a shoe, wherein the generating the two-dimensional model of the shoe comprises removing, from a three-dimensional model of the shoe, a portion of the three-dimensional model of the shoe corresponding to the portion of the foot that will be occluded by at least one of the portion of the leg or the portion of the clothing; and
   superimposing the two-dimensional model of the shoe onto the image of the foot.

5. The method of claim 4, wherein the first aspect is an orientation of the foot in the image, and wherein generating the two-dimensional model of the shoe comprises rotating a three-dimensional model of the shoe or the two-dimensional model of the shoe according to the orientation.

6. The method of claim 4, wherein the first portion comprises:
   a feature extractor that generates a vector based on one or more features of the plurality of features;
   a predictor that generates a heatmap based on the vector; and
   a post processor that generates a prediction based on the heatmap.

7. The method of claim 4, further comprising:
   receiving a selection of the shoe; and
   retrieving, from a database and based on the selection, a three-dimensional model of the shoe, wherein the two-dimensional model of the shoe is generated based on the three-dimensional model of the shoe.

8. The method of claim 4, wherein the second aspect is whether the foot in the image is a right foot or a left foot.

9. The method of claim 4, further comprising:
   detecting a position of the foot in a captured image; and
   cropping the captured imaged based on the detected position of the foot to produce the image of the foot.

10. The method of claim 4, wherein generating the two-dimensional model of the shoe comprises re-sizing a three-dimensional model of the shoe according to one or more features of the plurality of features.

11. A system comprising:
    a memory; and
    a processor communicatively coupled to the memory, the processor configured to:
       extract, using a backbone of a machine learning model, a plurality of features from an image of a foot, wherein the image further includes at least one of a portion of a leg or a portion of clothing;
       predict, using a first portion of the machine learning model and based on one or more features of the plurality of features, a first aspect of the foot;
       predict, using a second portion of the machine learning model and based on one or more features of the plurality of features, a second aspect of the foot different from the first aspect, wherein the second aspect is a portion of the foot that will be occluded by at least one of the portion of the leg or the portion of the clothing;
       generate, using at least the first aspect and the second aspect, a two-dimensional model of a shoe, wherein the generating of the two-dimensional model of the shoe comprises removing, from a three-dimensional model of the shoe, a portion of the three-dimensional model of the shoe corresponding to the portion of the foot that will be occluded by at least one of the portion of the leg or the portion of the clothing; and
       superimpose the two-dimensional model of the shoe onto the image of the foot.

12. The system of claim 11, wherein the first aspect is an orientation of the foot in the image, and wherein generating the two-dimensional model of the shoe comprises rotating a three-dimensional model of the shoe or the two-dimensional model of the shoe according to the orientation.

13. The system of claim 11, wherein the first portion comprises:
    a feature extractor that generates a vector based on one or more features of the plurality of features;
    a predictor that generates a heatmap based on the vector; and a post processor that generates a prediction based on the heatmap.

14. The system of claim 11, wherein the processor is further configured to:
receive a selection of the shoe; and
retrieve, from a database and based on the selection, a three-dimensional model of the shoe, wherein the two-dimensional model of the shoe is generated based on the three-dimensional model of the shoe.

15. The system of claim 11, wherein the second aspect is whether the foot in the image is a right foot or a left foot.

16. The system of claim 11, wherein the processor is further configured to:
detect a position of the foot in a captured image; and
crop the captured imaged based on the detected position of the foot to produce the image of the foot.

17. The system of claim 11, wherein generating the two-dimensional model of the shoe comprises re-sizing a three-dimensional model of the shoe according to one or more features of the plurality of features.

* * * * *